United States Patent [19]
Tanikawa

[11] Patent Number: 5,187,425
[45] Date of Patent: Feb. 16, 1993

[54] RECHARGEABLE BATTERY CONTROLLER

[75] Inventor: Roy K. Tanikawa, Irvine, Calif.

[73] Assignee: AST Research, Inc., Irvine, Calif.

[21] Appl. No.: 612,218

[22] Filed: Nov. 9, 1990

[51] Int. Cl.[5] .............................................. H02J 7/00
[52] U.S. Cl. ....................................... 320/31; 320/35
[58] Field of Search ................................... 320/31, 35

[56] References Cited

U.S. PATENT DOCUMENTS

| | | | |
|---|---|---|---|
| 3,531,706 | 4/1967 | Mullersman | 320/20 |
| 4,308,492 | 12/1981 | Mori et al. | 320/35 |
| 4,439,719 | 3/1984 | Lambert et al. | 320/31 |
| 4,564,798 | 1/1986 | Young | 320/31 |
| 4,647,834 | 3/1987 | Castelman | 320/31 |
| 4,651,081 | 3/1987 | Nishimura et al. | 320/31 |
| 4,659,977 | 4/1987 | Kissel et al. | 320/35 |
| 4,667,143 | 5/1987 | Cooper et al. | 320/35 |
| 4,709,202 | 11/1987 | Koenck et al. | 320/35 |
| 4,775,827 | 10/1988 | Ijntema et al. | 320/35 |
| 4,849,682 | 7/1989 | Bauer et al. | 320/31 |
| 4,992,720 | 2/1991 | Hata | 320/23 |
| 4,998,057 | 3/1991 | Shinohara et al. | 320/31 |
| 5,079,716 | 1/1992 | Lenhardt et al. | 320/35 |

FOREIGN PATENT DOCUMENTS

| | | | |
|---|---|---|---|
| 1453978 | 10/1976 | United Kingdom | 310/328 |
| 2061643 | 5/1981 | United Kingdom | 320/35 |
| 8902182 | 3/1989 | World Int. Prop. O. | 320/35 |

OTHER PUBLICATIONS

Preliminary Specification, "S87C752 CMOS Single-- Chip 8-Bit Microcontroller", Signetics, Feb. 1989, pp. 2-168-2-179.

Software Manual, "Battery Watch TM Release II", Traveling Software, Inc., Bothell, Wash., Aug. 1, 1989.

Specification, "Sanyo Rechargeable CADNICA® Batteries", Sanyo Electric Co., Ltd., Japan.

Specification, "5A and 2.5A High Efficiency Switching Regulators", Linear Technology, pp. 5-37-5-48.

Primary Examiner—Steven L. Stephan
Assistant Examiner—Thomas M. Dougherty
Attorney, Agent, or Firm—Knobbe, Martens, Olson & Bear

[57] ABSTRACT

A battery monitor system is disclosed comprising a microcontroller which monitors voltage inputs from a power adapter and a rechargeable battery. The power adapter includes a voltage source and a current source which outputs two current levels. A thermistor is thermally coupled to the battery, and the microcontroller receives voltage inputs from the battery and the thermistor. The microcontroller monitors and processes the voltage inputs to detect a predetermined voltage change corresponding to a change in the battery temperature and/or voltage level which indicates a fully charged battery. The level of the current which is provided to the battery from the current source is under the control of the microcontroller, such that the battery is maintained in a fully charged state.

4 Claims, 7 Drawing Sheets

RECHARGEABLE BATTERY CONTROLLER

FIELD OF THE INVENTION

The invention relates to battery charging systems, and, in particular, to a monitor system which monitors and controls the charging operation of a rechargeable battery.

BACKGROUND OF THE INVENTION

Battery powered devices, such as laptop computers, generally use rechargeable batteries so that the batteries can be periodically connected to a source of charging current (e.g., an AC adapter) to recharge the batteries to their full operational capacity. Typically, it is up to the user of such a laptop computer to determine when it is time to recharge the batteries either by monitoring the amount of time the computer has been used or by waiting until the computer stops operating. Many users carry spare batteries to allow the computer to continue to be used when a set of batteries becomes discharged. Often a laptop computer is operated with the batteries only when a source of AC power is not readily available. Thus, frequently the rechargeable batteries are not fully discharged between charging operations. In certain types of batteries, such as nickel-cadmium (NiCad) batteries, it is preferable to occasionally discharge the batteries fully so as to prevent a so-called memory effect problem. Basically, a battery having a four-hour charge capacity, for example, that is only used for one hour, for example, may become a one-hour battery unless it is occasionally fully discharged.

It can be understood that the monitoring of rechargeable batteries by a computer user is generally haphazard at best. Thus, many users frequently find themselves with batteries that do not provide the rated time between charges. Furthermore, a user typically does not know how much time is remaining on the current charge in the batteries when preparing to use the computer without connection to AC power. Software has been developed to reduce this problem. For example, BATTERY WATCH ™ Release II from Traveling Software of Bothell, Wash., is a terminate and stay resident (TSR) software program that runs in the background on a laptop computer and monitors the operation of the laptop computer to keep track of the amount of time left on the current charge. It performs this function by periodically (e.g., every 3.8 seconds) checking to see which of the hardware components (e.g., floppy disk drive, hard disk drive, display, etc.) are in operation, calculating the amount of power consumed by the operating components and calculating approximately how much charge is remaining in the batteries. When the batteries are recharged, a function key can be activated to inform the software so that the calculations begin again with a full charge. The software operates with different parameters based upon the power consumptions of the components in laptop computers from various manufacturers.

Although software battery monitoring programs are a benefit to many users, such programs still require extensive user interaction to inform the software when the batteries have been recharged and to respond to prompts from the software to connect the computer to a charger when the batteries are approaching the limit of the current charge.

SUMMARY OF THE INVENTION

The present invention is a fully automatic system for controlling the charging and discharging of batteries in a laptop computer. No user interaction is generally required in order to maintain the batteries in a fully charged condition. Unlike the above-described software system which relies upon keeping track of operating times and power consumptions of various components, the control of charging is based upon monitored voltages and temperatures of the rechargeable batteries.

One aspect of the present invention is a battery controller for controlling and monitoring a rechargeable battery. The battery controller comprises an adapter that includes a voltage source output that provides a first source of DC power and a current output. The adapter further includes a power available output indicating when the adapter is connected to an external source of power. The adapter further includes a control input that receives a control signal. The adapter varies the level of the current output in response to the control signal. The controller includes a rechargeable battery assembly that includes the rechargeable battery. The assembly further comprises an input connected to the current output of the adapter and an output providing a second source of DC voltage. The assembly has a thermistor thermally coupled to the rechargeable battery so that the thermistor is responsive to the temperature of the battery. The controller includes a relay that has a first input connected to the first source of DC power and a second input connected to the second source of DC power. The relay further comprises a control input, wherein the control input selects either the first or the second source of DC power as an output. A backup battery and a reference voltage source are also included. A microcontroller controls and monitors the charging operation of the rechargeable battery. The microcontroller includes an input connected to the backup battery to monitor the voltage of the backup battery, an input connected to the thermistor to monitor temperature changes in the rechargeable battery, an input connected to the reference voltage source, an input connected to the power available output of the adapter to monitor the status of the adapter, and an input connected to the rechargeable battery to monitor the voltage level of the rechargeable battery. The microcontroller has a first output connected to the control input of the relay wherein the first output controls the selection of the first or the second source of DC power to the relay output. The microcontroller has a second output connected to the control input of the adapter wherein the second output controls the level of the current output connected to the battery, thereby controlling the charging operation of the battery.

Another aspect of the present invention is a battery monitor system comprising an adapter that has a current source which outputs first and second current levels. A rechargeable battery is connected to the current source and has a first voltage output. The battery is coupled to a thermistor wherein the thermistor is responsive to the temperature of the battery and generates a second voltage output signal which varies as the temperature varies. A microcontroller connected to the rechargeable battery to monitor the first and second voltage output signals and generate an output control signal when a predetermined change in either the first or the second voltage levels occurs. The output control signal is con-

DETAILED DESCRIPTION OF THE INVENTION

Figure 1:
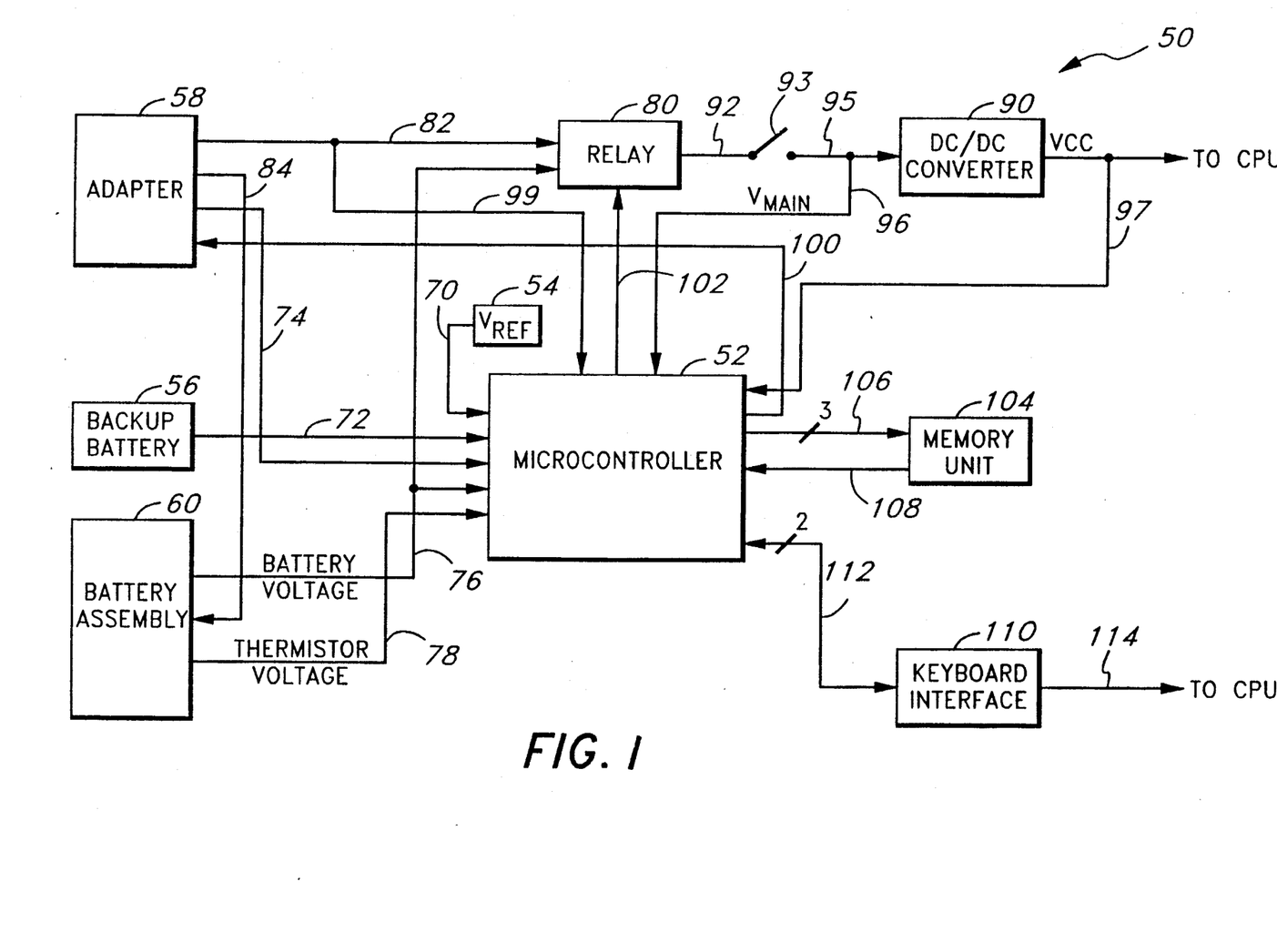
FIG. 1 illustrates a block diagram of a battery management system constructed in accordance with the present invention.

FIG. 1 illustrates a block diagram of a battery management system 50 constructed in accordance with the present invention. The system 50 includes a microcontroller 52 which receives analog input voltages from a reference voltage source 54 on an input signal line 70, a backup battery 56 on an input signal line 72, a power adapter 58 on an input signal line 74, and a battery assembly 60 on two input signal lines 76 and 78. The microcontroller 52 is preferably a Signetics S87C752 CMOS Single-Chip 8-Bit Microcontroller which includes five analog input ports selectively connected to an internal analog to digital converter by which it can determine the magnitude of the analog input signals on the ports.

The power adapter 58 provides input signals to a relay 80 along a signal line 82 and to the battery assembly 60 along a signal line 84. The relay 80 is further connected to the output signal line 76 from the battery assembly 60. The output of the relay 80 on a signal line 92 is provided to a switch 93 which controls the power on/off operation of a laptop computer (not shown). When the computer is on, the switch 93 is closed and the signal line 92 is connected to a signal line 95 which is in turn connected to the input of a DC/DC converter 90. A signal line 96 is connected to the input signal line 95 of the converter 90 and provides an input signal to the microcontroller when the switch 93 is closed, thereby indicating to the microcontroller 52 that the computer is on. The output voltage of the DC/DC converter 90 is provided to a CPU in the laptop computer on a signal line 94. The microcontroller receives power inputs from the output of the converter 90 on a signal line 97 and the output of the adapter 58 on a signal line 99.

As will be explained in more detail below, when the microcontroller is powered from either the VCC or VSOURCE inputs, control signals are generated by the microcontroller and provided to the adapter 58 and relay 80 on two signal lines 100 and 102, respectively, which control the charging operation of the battery assembly 60. Output signals from the microcontroller 52 are also received by a memory unit 104 along three signal lines generally designated 106. Data output signals from the memory unit are input to the microcontroller via a signal line 108. The microcontroller 52 further communicates with a keyboard interface 110 via a bidirectional signal line 112. The keyboard interface 110 is connected to the CPU (not shown) via a signal line 114.

Figure 2:
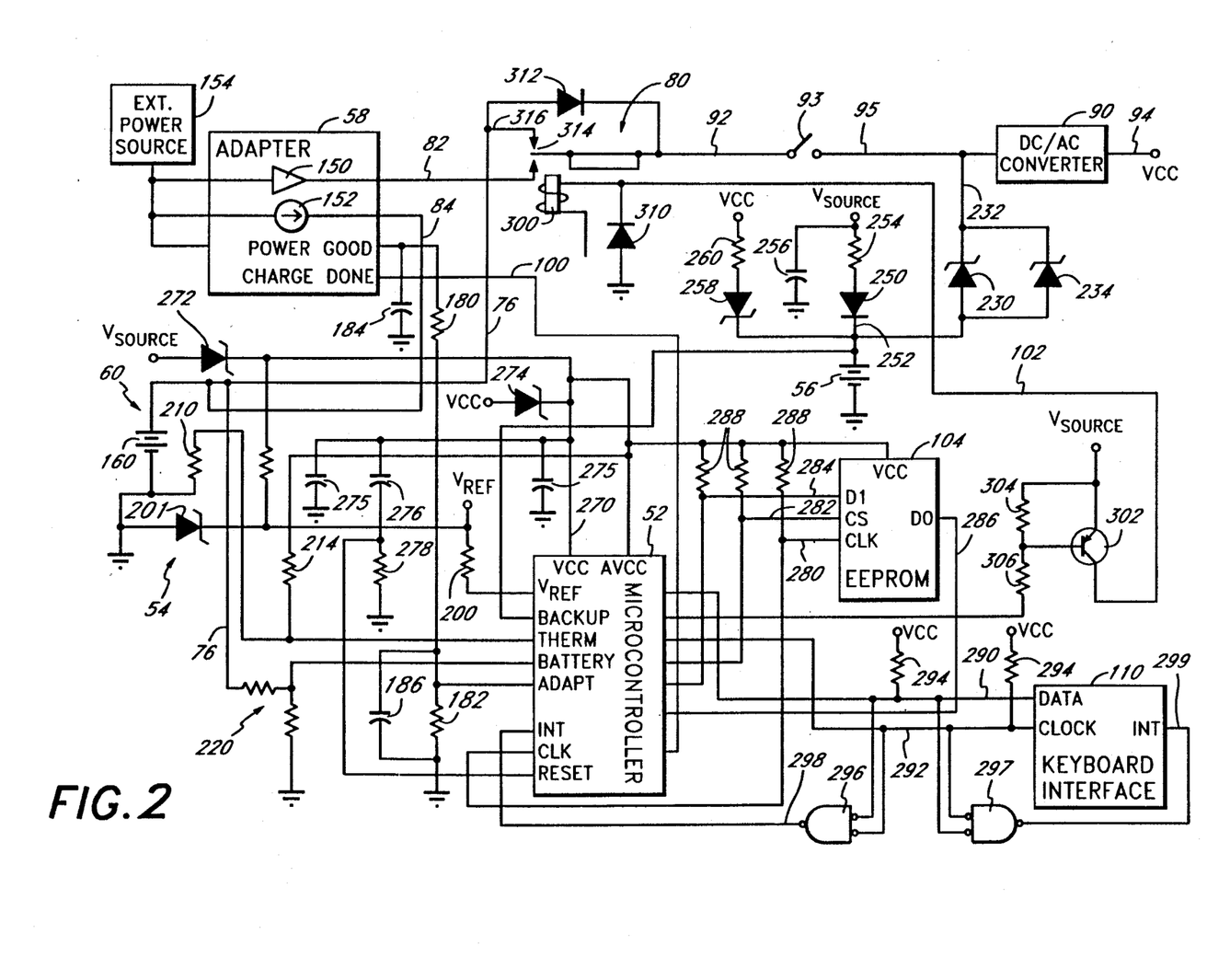
FIG. 2 is a schematic diagram of the system of FIG. 1.

FIG. 2 illustrates a more detailed diagram of the battery management system 50 of the present invention. As shown, the adapter 58 includes a voltage source 150 and a current source 152 connected to an external source of power 154. The adapter may comprise an AC/DC adapter connectable to a standard wall socket, or a car adapter connectable to a power source, such as a cigarette lighter, in an automobile. The voltage source 150 is connected to the relay 80 to provide a first source of DC voltage, VSOURCE, to the relay on the signal line 82. The current source 152 is connected to the signal line 84 to provide a charging (I CHARGE) current to a battery 160 in the battery assembly 60. A CHARGE CONTROL signal input from the microcontroller 52 on a signal line 100 varies the level of current output from the current source in a conventional manner, e.g., by varying the level of a series resistance. Preferably, the current source 152 has a first current level, FAST CHARGE, at approximately 1.9 to 2.4 Amps, and a second current level, TRICKLE CHARGE, at approximately 200 to 400 mA, wherein the control signal from the microcontroller 52 selects either the FAST CHARGE or TRICKLE CHARGE level.

The adapter 58 further includes a power indicator circuit which outputs a power available signal (POWER GOOD) on the signal line 74 when the adapter 58 is receiving power from the external power source 154. Two series resistors 180, 182 are connected to the signal line 74 to form a voltage divider. Two filter capacitors 184, 186 are connected to the voltage divider as shown. When the adapter 58 is connected to the external source 154, the POWER GOOD signal of the line 74 has a high voltage level. The voltage divider scales the high voltage level to a voltage compatible with the analog inputs of the microcontroller 52.

The reference voltage source 54 is connected to an input port of the microcontroller 52 via an isolation resistor 200. The source 54 comprises a 2.5 volt Zener diode 201 having its anode connected to a reference ground and its cathode connected to an analog input of the microcontroller 52. As will be explained in more detail below, this external source 54 provides a 2.5 volt reference voltage used to normalize the analog inputs to the microcontroller 52.

The battery assembly 60 includes a thermistor 210 which is thermally coupled to the rechargeable battery 160 such that the voltage across the thermistor 210 varies with the temperature of the battery 160. The thermistor 210 is connected to an input port of the microcontroller 52 via the signal line 78 and is used to indicate the temperature of the battery 160. The thermistor is connected between the ground reference and a resistor 214. The resistor 214 is connected to the supply voltage. The thermistor 210 and the resistor 214 act as a voltage divider such that the voltage level input to the microcontroller 52 on the signal line 78 varies as the voltage across the thermistor 210 varies. The microcontroller 52 measures the voltage from the voltage divider on the input signal line 78 and this analog voltage is converted into a digital signal by the internal analog to digital converter in the microcontroller 52. The microcontroller 52 stores a lookup table 212 as shown below which stores the corresponding battery temperatures for a plurality of digital values, or ADC codes.

The column of the table 212 labeled "RT" is the resistance of the thermistor.

| BATTERY TEMPERATURE LOOKUP TABLE | | |
|---|---|---|
| TEMP. (°C.) | RT (K ohms) | ADC code (decimal) |
| 0 | 32.6 | 196 |
| 2.5 | 28.0 | 189 |
| 5.0 | 24.4 | 182 |
| 7.5 | 22.3 | 177 |
| 10.0 | 19.9 | 170 |
| 12.5 | 17.7 | 164 |
| 15.0 | 15.7 | 156 |
| 17.5 | 13.9 | 149 |
| 20.0 | 12.5 | 142 |
| 22.5 | 11.0 | 134 |
| 25.0 | 10.0 | 128 |
| 27.5 | 8.9 | 121 |
| 30.0 | 8.1 | 115 |
| 32.5 | 7.3 | 108 |
| 35.0 | 6.5 | 101 |
| 37.5 | 6.0 | 96 |
| 40.0 | 5.3 | 89 |
| 42.5 | 4.7 | 82 |
| 45.0 | 4.4 | 78 |
| 47.5 | 4.0 | 73 |
| 50.0 | 3.6 | 68 |
| 52.5 | 3.3 | 64 |
| 55.0 | 3.0 | 59 |
| 57.5 | 2.7 | 55 |
| 60.0 | 2.5 | 51 |

The microcontroller locates the digital value detected from the voltage input from the battery 160 to determine the temperature of the battery 160. For example, an ADC code of 128 detected by the microcontroller indicates a battery temperature of 25° C. Those skilled in the art will recognize that the resistance values in the above table are included for reference only, and need not be stored in the internal memory of the microcontroller 52.

The battery 160 provides a second source of DC voltage, VBATTERY, and is connected to an input port of the microcontroller 52 and an input of the relay 50 via the signal line 76. A resistor network 220 is positioned intermediate the battery 160 and the microcontroller 52 and acts as a voltage divider so that the voltage input to the microcontroller 52 on the signal line 76 does not exceed the voltage level input from the reference voltage source 54.

The present invention can be advantageously incorporated in laptop computer systems wherein power is often provided from both a rechargeable battery and an external power source, such as those described above. Such computer systems often have "sleep" modes wherein operation of the system is suspended for a short period of time. In addition, laptop computers are often used in environments where external power is not available, and operating power is derived solely from the battery. With the microcontroller 52 of the present invention, strict monitoring and charge control of the battery 160 is provided, thereby minimizing loss of operating power and time due to battery recharging or failure.

An analog input signal from the backup battery 56 is received by the microcontroller 52 on the signal line 72 so that the microcontroller 52 continuously monitors the voltage level output from the backup battery 56. The backup battery 56 is further connected through a first Schottky diode 230 on a signal line 232 to the output voltage line 92 of the relay 80. A second Schottky diode 234 is connected in parallel with the first diode 230. The Schottky diodes 230, 234 ensure that if the voltage level output from the relay 80 on the signal line 92 is 0.3 volts lower than the voltage of the backup battery 56, the backup battery 56 conducts current on the signal line 232 which is then provided to the CPU on the signal line 94. Thus, if the rechargeable battery 160 fails and the adapter 58 is not connected to the external source 154, power is provided to the computer via the backup battery 56 and no loss of operation occurs. In this manner, if the computer is then put in its "sleep mode," which requires relatively little power, the DC/DC converter 90 receives voltage from the backup battery 56, which advantageously enables the rechargeable battery 160 to be replaced without interrupting operation of the CPU.

To keep the backup battery charged, the backup battery 56 is connected to VSOURCE via a diode 250 and a resistor 254. A filter capacitor 256 is connected between VSOURCE and the ground reference. The backup battery 56 is further connected to VCC via a Schottky diode 258 and a resistor 260. The value of the resistor 254 is selected to be less than the value of the resistor 260 such that the backup battery 56 is charged by VSOURCE when the adapter 58 is present.

As described above, the temperature level and voltage level of the rechargeable battery 160 is continuously monitored by the microcontroller 52. As will be described in more detail below, when a predetermined voltage or temperature signal level is reached, the microcontroller 52 outputs control signals to the current source 152 in the adapter 58 and the relay 80 which control subsequent charging operation of the battery 160 by controlling the voltage supplied to the CPU and the current level input to the battery 160.

In accordance with the present invention, the temperature of the battery 160 is continuously monitored by monitoring the voltage across the thermistor 210 which is responsive to the temperature as discussed above. As described above, the microcontroller 52 stores the temperature look up table 212 which is accessed to locate the corresponding temperature for the ADC code of the battery voltage level input on the signal line 78.

A separate battery assembly 60 is provided for alkaline batteries which does not include a thermistor 210. In this assembly, the analog voltage input to the microcontroller 52 on the signal line 78 is at its highest value, and the ADC code detected by the microcontroller 52 is FF. In this manner, the microcontroller 52 is able to detect the presence of an alkaline battery in the battery assembly 60.

Figure 3:
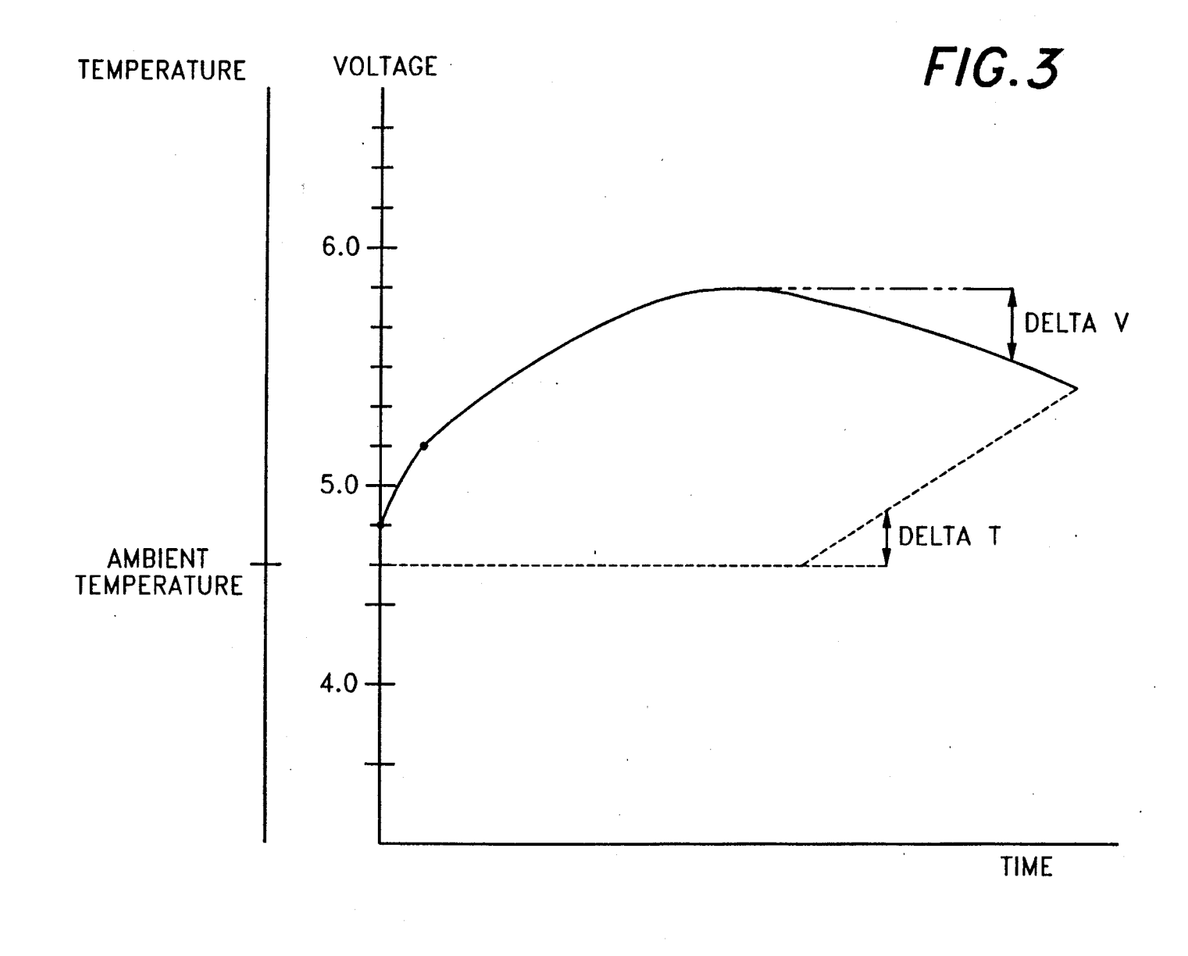
FIG. 3 illustrates a characteristic curve of an exemplary rechargeable battery.

FIG. 3 illustrates a general characteristic curve for a 6 volt rechargeable battery. The dotted line illustrates the temperature behavior of the battery 160 with increasing charge time, while the solid line represents the voltage level of the battery 160 as a function of charge time. As illustrated, the battery 160 remains at a substantially constant temperature until fully charged. When fully charged at approximately 6 volts, the internal resistance of the battery 160 increases and, in turn, the output voltage drops and the temperature of the battery 160 rises rapidly. This increased temperature raises the level of the signal output by the thermistor 212, and this increase in signal level is detected by the microcontroller 52. Because the temperature change of the battery 160 is a function of the charge current, this temperature rise will be smaller when the system 50 is trickle charging than when the system 50 is fast charging. When trickle charging, the delta T temperature rise is small. In the fast charge mode, a delta T rise of approximate 15°-20° C. indicates that the battery 160 is fully charged. In the event that the battery temperature rises to 60° C., charging of the battery 160 is terminated.

During the initial phase of the battery charging operation, the battery temperature must be measured so as to determine the ambient temperature In some situations, this ambient temperature may be higher than during the charge operation to follow and the battery temperature will decrease with charge time. If this situation occurs and the temperature of the battery 160 does decrease as the charging operation progresses, the lower temperature should be used as the base temperature for determining the delta T temperature rise indicative of a fully charged battery.

In addition to monitoring temperature changes in the battery 160, the microcontroller 52 also continuously monitors changes in the battery voltage. When the battery 160 becomes fully charged, the voltage of the battery 160 decreases from its peak level. Thus by continually monitoring a delta V voltage level change of the battery 160, a fully charged state can be detected by the microcontroller 52 when delta V becomes negative. The delta V voltage level change of the battery 160 is a function of the charge current applied to the battery 160 such that this detection method should be used only when the current source output is at the FAST CHARGE level. Preferably, a delta V decrease in voltage of 150 mV indicates a full charge state. This delta V voltage level change of the battery 160 is susceptible to external influences, including charge currents and the ambient temperature, and thus the voltage measurements detected by the microcontroller 52 must be integrated with time. Although detection of the delta V voltage level change can be used alone as an indication of full charge of the battery 160, this technique is much more reliable when used in conjunction with the delta T temperature detection technique as described above. A battery low condition is detected by the microcontroller 52 at approximately 4.5 volts, and battery failure is detected at approximately 4.0 volts.

The charging time of the battery 160 is monitored by the microcontroller 52 as fail safe protection to prevent overcharging of the battery 160. At FAST CHARGE, the charging time should be limited to approximately 4 hours. At TRICKLE CHARGE, no time limit is required and the battery 160 should maintain a fully charged state. The microcontroller 52 further monitors the peak voltage reached by the battery 160 as an indication of a faulty battery. If the battery voltage exceeds 7.0 volts, FAST CHARGE is terminated.

The VSOURCE and VCC power inputs to the microcontroller are connected to a common signal line 270 through a diode 272 and a diode 274, respectively, such that the microcontroller is powered on when the adapter 58 is connected to the external power source 154 or when the computer is on. The common signal line 270 is connected to the supply voltage VCC and analog supply voltage and reference AVCC inputs of the microcontroller 52. Filter capacitors generally designated 275 are connected in parallel between the signal line 270 and the common ground reference. In this manner, the VSOURCE voltage from the adapter voltage source 150 is input to the microcontroller 52 when the adapter 58 is connected to the external power source 154 and supplied from VCC when the adapter 58 is not connected to the external source 154. Because the microcontroller 52 uses the VCC voltage for the ADC conversion which is not a precision voltage, the voltage from the reference voltage source 54 is input to the microcontroller 52 and measured using the AVCC as a reference. The thermistor signal input to the microcontroller 52 need not be compensated as the resistor 214 is referenced to the AVCC voltage and the analog voltage is a measurement of the ratio of the thermistor resistance and the resistance of the pullup resistor 214. However, the remaining analog inputs to the microcontroller 52 must be compensated for variations in the AVCC signal level. This compensation is accomplished according to the equation:

$$V_{in} = ADC1 \cdot V_{ref}/ADC2$$

wherein vin is the input voltage; ADC1=ADC result of Vin,

Vref=2.5 V reference voltage, and ADC2=ADC result of the 2.5 V reference voltage In accordance with the equation set forth above, after performing an analog to digital conversion on the analog input signal and on the 2.5 volt reference voltage signal, the result obtained from the ADC of the input is then divided by the result obtained from the ADC of the reference voltage. This result is then normalized by multiplying by 2.5 to give the compensated input voltage of the analog inputs received by the microcontroller 52. Thus, an accurate measurement of the input voltage can be obtained without a high voltage reference source for the AVCC input of the microcontroller 52.

The microcontroller 52 further includes a reset input which is connected between a capacitor 276 and a resistor 278. The capacitor 276 is connected in parallel with the filter capacitors 275 and the resistor 278 is connected to the ground reference. The capacitor 276 and resistor 278 act in a conventional manner as an RC time constant to generate a reset input to the microcontroller 52 when a 5 volt voltage connected to the capacitor 276 via common voltage signal line 270 gradually decreases to ground, thereby releasing the reset.

Battery parameters including the delta V, delta T, and charge time parameters described above, are stored in the ROM resident in the microcontroller. In response to the inputs received from the battery 160, the thermistor 210, the backup battery 56, the reference voltage source 54, and the adapter 58, control signals are generated and output to the current source 152 and relay 80 which control subsequent charging of the battery 160 and voltage input to the CPU.

The microcontroller 52 is connected to a memory unit 104, such as an electrically erasable programmable read only memory, or EEPROM. Clock signals are input to the EEPROM 104 on a signal line 280, and a chip select signal is input to the EEPROM on a signal line 282. Data is written into a status register stored in the EEPROM 104 via a signal line 284, and data is transmitted from the EEPROM to the microcontroller 52 on a signal line 286. Pull up resistors, generally designated 288, are connected between the input signal lines 280, 282, 284 and the common voltage signal line 270. The EEPROM 104 stores battery charge parameters which can be downloaded via the keyboard interface 110 if the battery 160 is replaced and are read by the microcontroller 52 during the monitoring and charging procedures described above.

The keyboard interface 110 transmits data and clock signals to and receives data and clock signals from the microcontroller 52 on two bidirectional signal lines 290 and 292, respectively. Each signal line 290, 292 is connected to VCC via a respective pull up resistor 294. The signal lines 290, 292 are further input to a NAND gate 296. The output of the NAND gate 296 is input to the microcontroller 52 on a signal line 298. The microcontroller 52 communicates with the keyboard interface 100 using an industry standard PS/2 data communication protocol wherein the clock and data lines 290, 292 are monitored for active low signals indicating the start of data transmission. When the signals on the lines 290 and 292 are both low, the output of the NAND gate 296 on signal line 298 is low, generating an interrupt at the microcontroller 52. In a similar manner, a NAND gate 297 generates an interrupt signal input to the keyboard interface 110 on a signal line 299 when data and clock signals from the microcontroller 52 are both low. The microcontroller 52 initiates data transmissions via the lines 290 and 297 to inform the keyboard interface of battery fail or battery low conditions detected. Otherwise, the microcontroller 52 responds to requests for data locations to be accessed by the keyboard interface 110.

Figure 4:
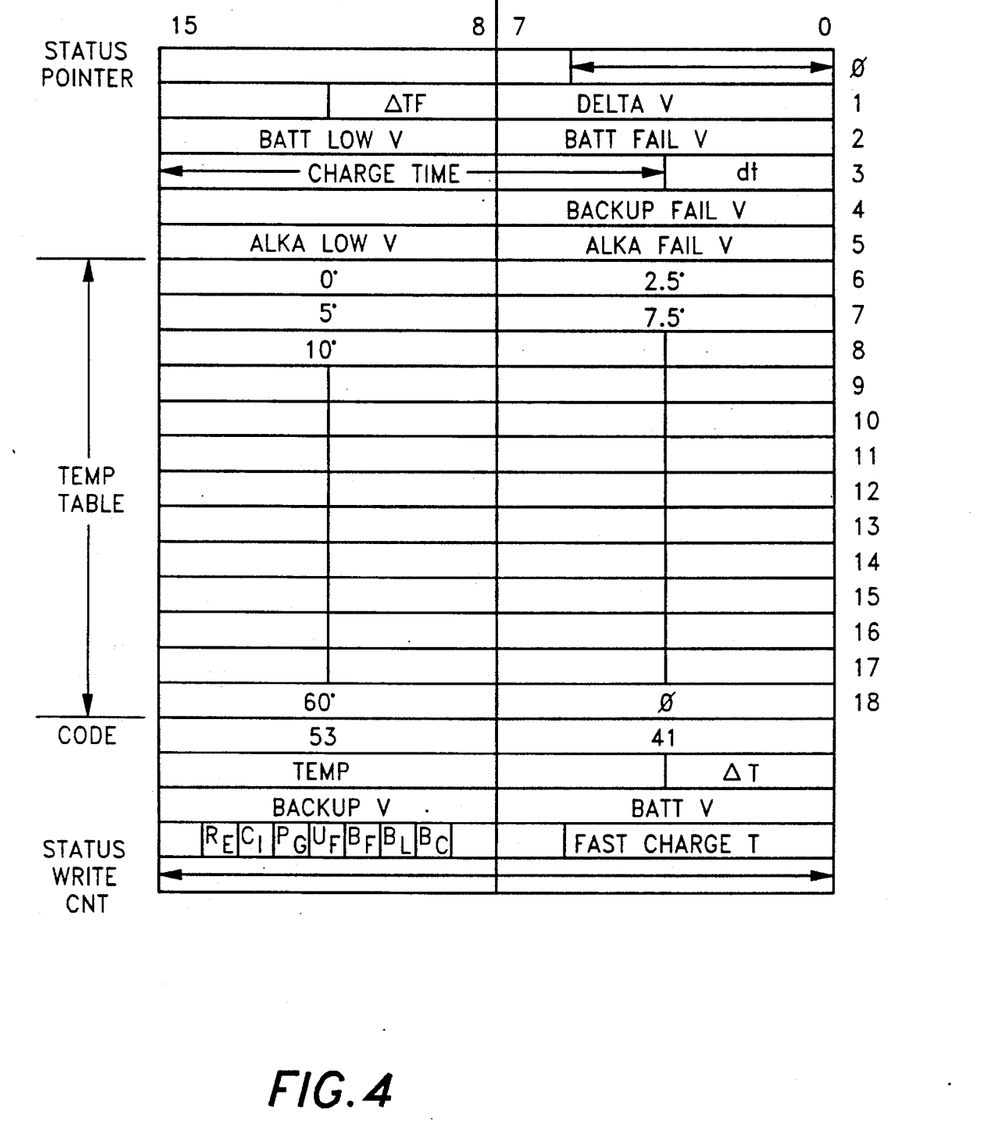
FIG. 4 shows the memory locations of the status data and battery parameters stored in the memory unit.

FIG. 4 illustrates the configuration and organization of the status register contained in the EEPROM 104. This status register stores battery parameters which have been downloaded from the keyboard interface 110 and flags relating to the current charge status of the battery 160 and backup battery 56.

Word 20 stores battery status information. Bits 0 through 5 store the time of the last fast charge. This counter is incremented and saved to the memory unit every dT minutes. When this time exceeds the charge time parameter of the battery 160, a battery charged flag at bit 8 is set high. The battery charged flag is set low after 10 minutes of computer use when the computer is turned on and ignored when the battery 160 is removed or the microcontroller 52 loses power. Bit 9 is battery low flag which is set high when the battery voltage is below a predetermined trip voltage level. In a similar manner, bit 10 is a battery fail flag which is set high when the battery voltage is below a predetermined fail voltage level. A backup fail flag is stored at bit 11 and is set high when the voltage of the backup battery 56 falls below an established backup fail trip voltage. Bit 12 is a power good flag which is set high when power is available as indicated by the signal received by the microcontroller 52. An adapter in flag stored at bit 13 is set high when the adapter 58 is connected to the external source of power 154. Bit 14 is set high when the battery parameters have been changed and must be downloaded the EEPROM 104. This bit is set low when the default parameter from the ROM are to be used.

Word 0 is the status word pointer. Bits 0 through 5 store the location of the contents which give the address of the status byte. The status and counter words are continuously changing as a result of the charging and monitoring of the battery 160 under the control of the microcontroller 52. These words are written a maximum of 65,000 times in a single memory word location after which they are moved to other locations within the register. A particular location in the EEPROM 104 can only be written a maximum of approximately 100,000 times before the data retention integrity of that location becomes unreliable. To keep track of the present memory word locations of the counter and status word, the pointer is incremented by one after each move. Thus, by reading the address stored in bits 0 through 5 of the pointer, the present location of the counter and status words can be quickly and easily determined by the microcontroller 52.

Words 1-5 store battery charge information input to the memory unit 104 from the microcontroller 52. Word 1 stores the temperature and voltage level changes detected by the microcontroller 52. As shown, Bits 0 through 7 store the delta V levels of the battery. During fast charge, when the battery voltage level drops by the amount specified by delta V, the battery 160 is fully charged. Thus, when a voltage drop greater than delta V is detected by the microcontroller 52, the CHARGE CONTROL signal output from the microcontroller 52 is set high and the current source 152 outputs the lower, or TRICKLE CHARGE current level, to the battery 160. In addition, the battery charged flag is set high. Bits 8 through 15 store the delta T temperature change levels. Bits 8 through 11 hold the temperature change level at the fast charge current level, and bits 12 through 15 hold the temperature change level at the trickle charge current level. If the charging current level is switched, the current low temperature is retained and all subsequent temperature measurements are referenced to it. During charging, if the battery temperature exceeds the lowest battery temperature yet observed by the amount specified by delta T, the battery 160 is considered charged and the CHARGE CONTROL signal and battery charged flag are set high.

Words 2 and 5 store the discharge trigger voltages. Bits 0 through 7 hold the battery fail trip voltage and bits 8-15 hold the battery low trip voltage. Word 2 contains the parameters for NiCad batteries, and word 5 contains the parameters for alkaline batteries. When the battery voltage drops below either of these levels, the corresponding battery low or battery fail flag is set high. If the voltage of the battery 160 is near a trip voltage, small variations of the voltage can repeatedly change the status of the battery low and battery fail flags by oscillating around the trip voltages, thereby producing multiple interrupts of the keyboard interface 110 to alert the computer user. To prevent this situation from occurring, the battery low and battery 160 fail flags are not removed unless the voltage of the battery is measured to be approximately 0.2 volts greater than the respective low or fail trip voltage.

Word 3 stores the charge time of the battery 160. Bits 0 through 3 store the amount of time dT in minutes between backups from the microcontroller 52 to the EEPROM 104. Bits 4 through 15 store the maximum amount of time in minutes to charge the battery 160 in FAST CHARGE. The trigger voltage for detecting failure of the backup battery 56 is stored in word 4. When the voltage of the backup battery 56 falls below the value stored here, the backup fail flag is set.

Words 6 through 18 are reserved for a substitute temperature conversion table in the event that the thermistor 210 is replaced. The conversion table values can be downloaded to the EEPROM 104 from the keyboard interface 110.

Word 19 stores EEPROM data identification. Anytime that data is requested from the EEPROM 104, the data identification stored at word 19 is compared with a 16 bit code stored in the ROM. If the data words are identical, the battery voltage and temperature parameters are provided by the EEPROM 104, otherwise default values stored in the resident ROM of the microcontroller 52 are used in the charging and monitoring operations described above. Thus if the EEPROM 104 is not installed or it has failed, it will not send back the expected data word and the microcontroller 52 accesses it internal ROM.

Words 20 and 21 store current voltage and temperature information. Bits 0 thorough 7 in word 20 store the current delta T, and bits 8 through 15 store the current temperature ADC information received from the microcontroller 52. In word 21, bits 0 through 7 store the current battery voltage ADC information from the microcontroller 52 and bits 8 through 15 store the current backup battery voltage ADC information. The remainder of the EEPROM space could be used to cycle the status register.

The operation of the microcontroller 52 to control its outputs will now be described in detail. When the microcontroller 52 has determined that the battery is fully charged, either by detecting the temperature change or voltage peak of the battery 160 as described above, the CHARGE CONTROL signal is generated and output to the adapter 58 on the signal line 100, switching the level of current from FAST CHARGE to TRICKLE CHARGE. When the battery 160 is fully charged, the microcontroller 52 causes the control signal to go high, and the current source 152 then supplies TRICKLE CHARGE to the battery 160 on the signal line 84. When the battery 160 is low, the control signal is low and the FAST CHARGE current level is input to the battery 160.

The VMAIN signal activated when the switch 93 is closed is input to the micrcontroller 52 on the signal line 96 so that the microcontroller 52 can monitor the on/off status of the computer. When the computer is on, there is not sufficient power to fast charge the battery 160. When the microcontroller 52 detects that the computer is on, it then checks the POWER GOOD signal to determine if the adapter 58 is connected to the external power source 154. If the microcontroller determines the adapter 58 is connected to the external source 154, the CHARGE CONTROL signal is set high to set the level of the current source 152 to TRICKLE CHARGE.

A second control signal generated by the microcontroller 52 is input to the relay 80 on the signal line 102 and controls the selection of the voltage which is subsequently provided to the DC/DC converter 90. When the adapter 58 is connected to the external source of power 152, the CPU receives power from the voltage source 150 and not the battery 160. When the adapter 58 is connected to the external source 154, the POWER GOOD signal is received by the microcontroller 52 and the control signal sent to the relay 80 is low, and the voltage source input, VSOURCE, of the relay 80 on the signal line 82 is selected and output to the DC/DC converter 90 on the signal line 92. Alternatively, when the adapter 58 is not connected to the external power source 154, the control signal output to the relay 80 is high, and the battery voltage input, VBATTERY, on the signal line 76 is selected to be output to the converter 90.

The relay 80 has a coil 300 that has one terminal connected to the ground reference and has its second terminal connected to the collector of a PNP transistor 302. The collector of the PNP transistor 302 is connected to VSOURCE via a pull-up resistor 304 to bias the PNP transistor 302 in an off condition. The base of the PNP transistor 302 is connected to the microcontroller 52. The relay 80 is turned on by outputting an active low signal from the microcontroller 52 to turn on the transistor 302, which in turn provides current from VSOURCE to the coil 300. Thus, the transistor operates as a buffer so that a relatively low current from the output of the microcontroller 52 can control the current needed to activate the relay 80. A diode 310 is connected across the relay coil 300 with its anode connected to the ground reference to suppress voltage transients in a conventional manner when the transistor 302 is turned off. When the relay 80 is inactive, the normally closed contacts of a relay switch 314 connect the output of the battery 60 to the output of the relay 80. When the relay 80 is activated, the normally open contacts of the switch 314 close to connect VSOURCE to the output of the relay 80. The relay 80 further includes a diode 312 connected between the battery voltage and the relay output to provide the battery voltage to the relay output during the switching transition.

Figure 5:
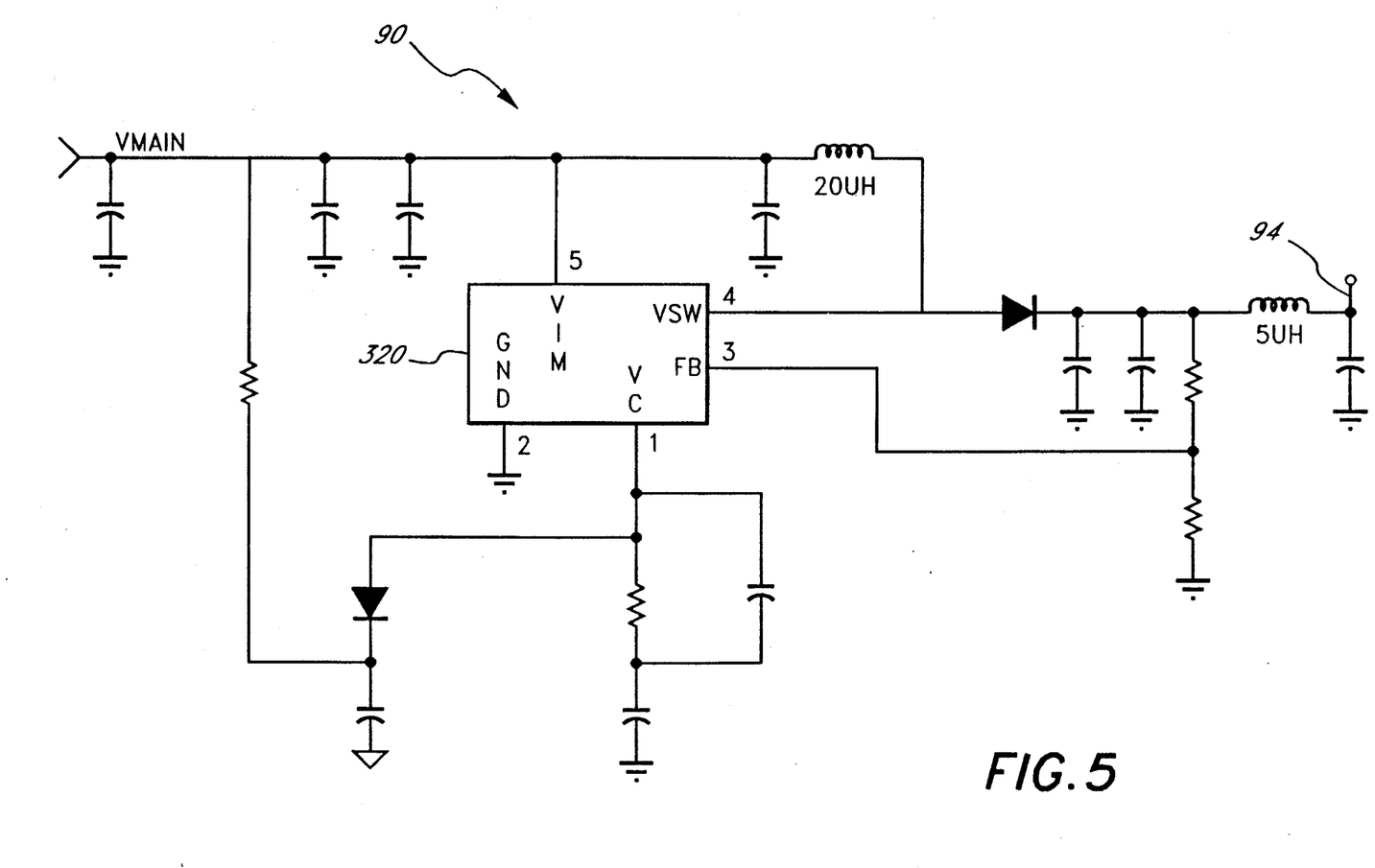
FIG. 5 is a schematic diagram of a DC/DC converter.

A schematic diagram of the DC/DC converter 90 is shown in FIG. 5. The converter 90 is a standard step-up DC/DC converter including a switching regulator 320 incorporated in a conventional pulse width modulation design. The output voltage VCC on signal line 94 provided to the CPU is controlled in response to the feedback voltage by varying the width of the output pulse applied to the Vsw terminal of the switching regulator. The operation of such circuits is well known to those skilled in the art. The DC/DC converter 90 advantageously provides a substantially constant 5.0 volt output with input voltages as low as 3.0 volts so that Vcc can be supplied by the backup battery 56.

Figure 6:
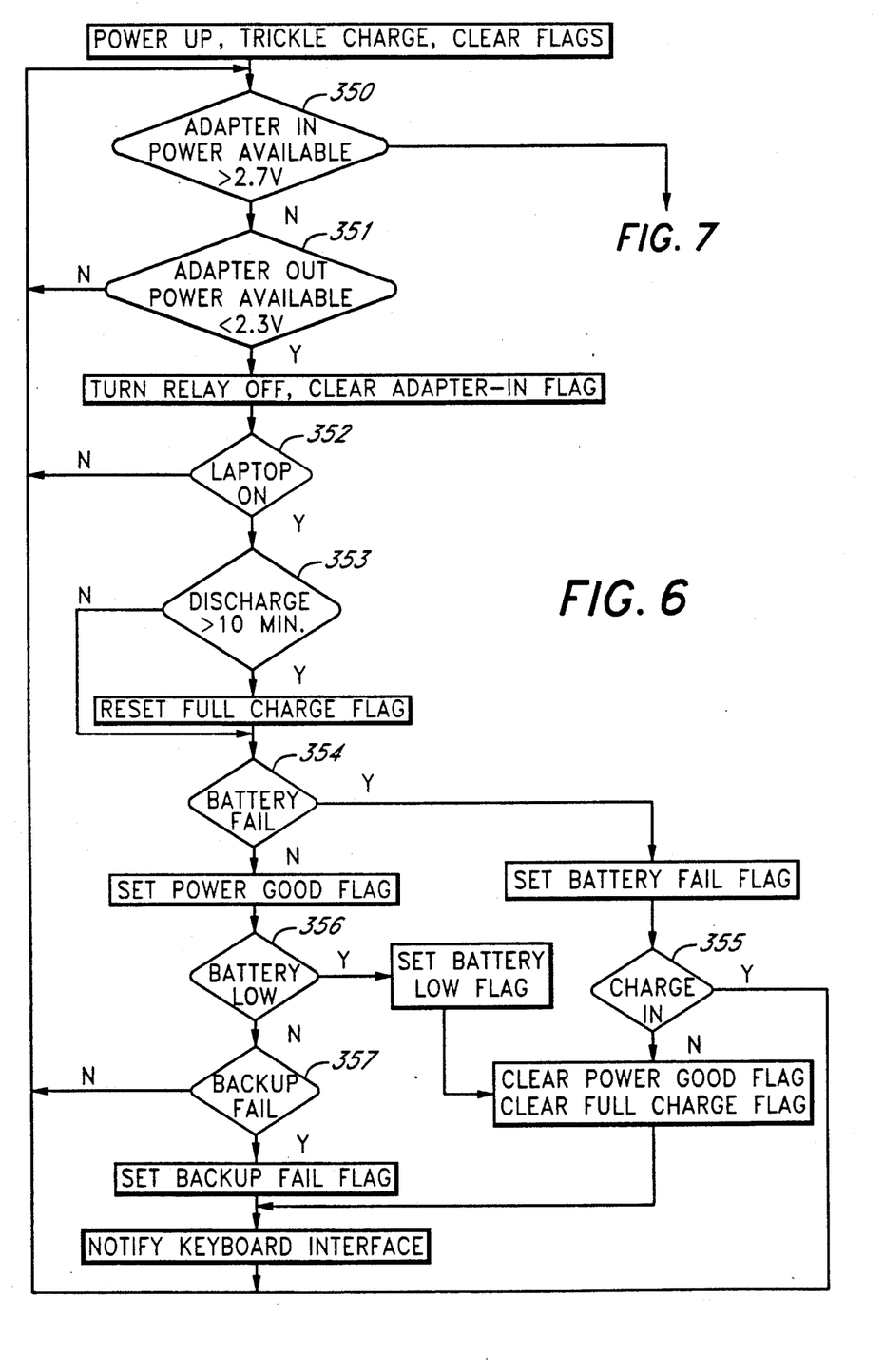
FIGS. 6 and 7 are flow charts illustrating the battery monitoring and charging procedures in accordance with the present invention.
Figure 7:
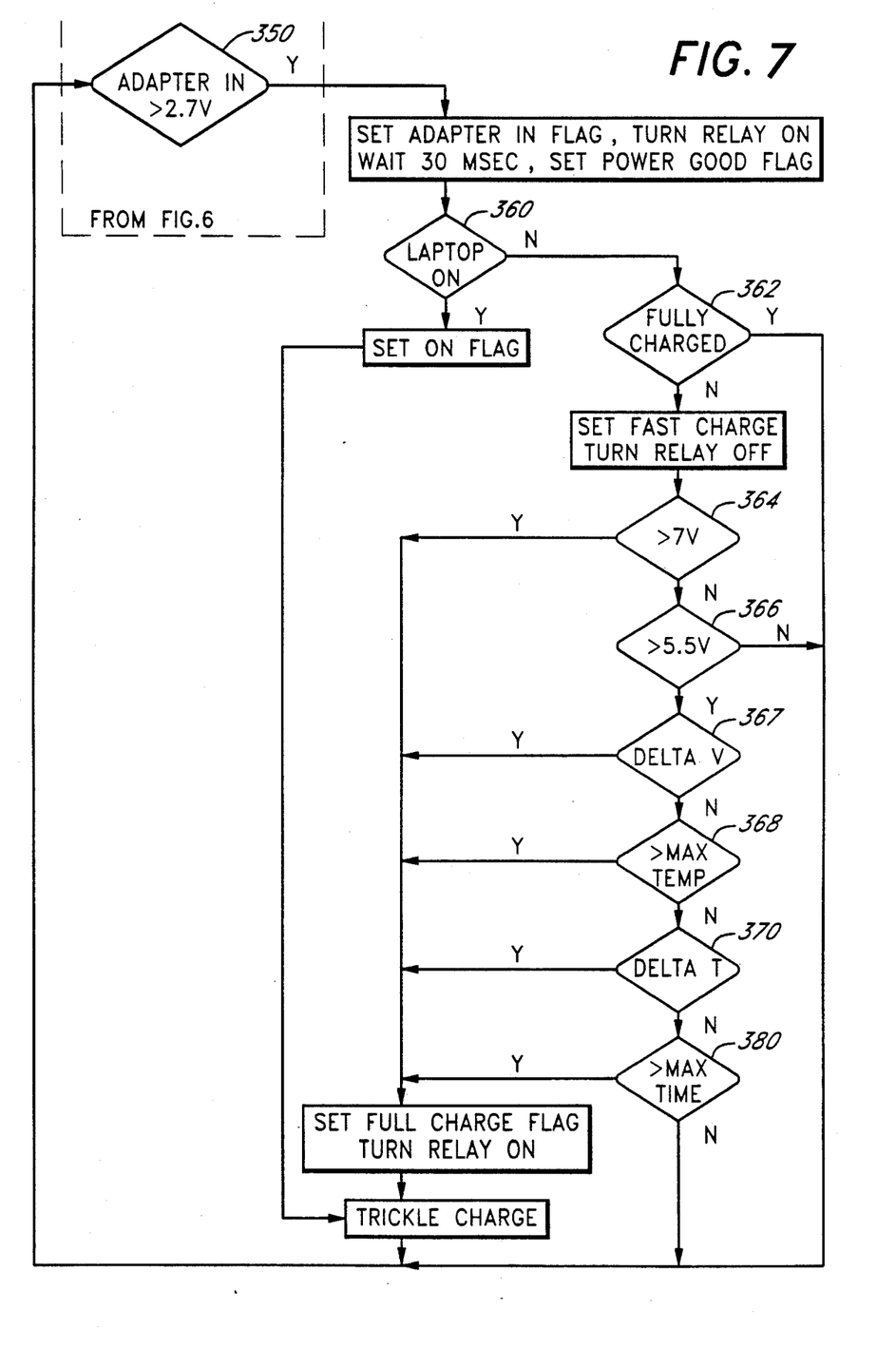

The microcontroller 52 controls and monitors the charge status of the battery 160 in accordance with the procedure illustrated in the flow charts of FIGS. 6 and 7. Referring to FIG. 6, upon power up of the CPU, the microcontroller 52 sets the level of the current source 152 to TRICKLE CHARGE and clears all the status flags in the EEPROM. The microcontroller 52 then checks the signal level of the power available input from the adapter 58, as represented by decision block 350. If the signal read by the microcontroller is greater than 2.7 volts, the microcontroller 52 determines that the adapter 58 is connected to the external source 154 and that power is available. If the voltage level is detected at less than 2.7 volts, the microcontroller 52 then determines if the voltage level is less than 2.3 volts as represented by decision block 351. If the voltage level is less than 2.3 volts, this indicates that the adapter 58 is not connected to the external power source 154. In this case, the microcontroller 52 sets the relay control signal on the signal line 102 high, and the relay 80 switches from the VSOURCE input to the VBATTERY input. Additionally, the ADAPTER IN flag in the memory unit 104 is set low. If greater than 2.3 volts, the adapter 58 is present but not yet supplying sufficient power to charge the battery 160 or to signal the computer, and in this case, the program returns to decision block 350 and the program repeats.

As represented by decision block 352, the microcontroller 52 next checks to determine if the laptop is on. If the laptop is on, the discharge time bits are checked to determine the amount of discharge time. As illustrated by decision block 353, if the amount of discharge time is greater than 10 minutes, the full charge flag is set low.

Once this flag has been set low, or if the battery 160 has been discharged for less than 10 minutes, the program passes to decision block 354 and the microcontroller 52 then monitors the voltage level of the battery 160 to detect battery failure. When the battery voltage is determined to be lower than the battery fail trip voltage, the battery fail flag is set. If the microcontroller 52 determines that the battery voltage is not lower than the fail trip voltage, the power good flag is set.

After the battery fail flag has been set, the microcontroller 52 then checks the POWER GOOD signal input on the signal line 74 to determine if the adapter 58 is connected to the external power source 154 as represented by decision block 355. If the microcontroller 52 determines the adapter 58 is not connected to the external source 154, the power good and full charged flags are cleared, and the microcontroller 52 communicates this information to the keyboard interface 110.

If the power good flag is set as a result of not detecting battery failure at decision block 354, the microcontroller 52 checks the voltage input of the battery 160 as illustrated at decision block 356 to determine if the battery voltage is below the low trip voltage level. If the microcontroller 52 determines the battery voltage is below the trip level, the battery low flag is set and the power good and full charge flags are cleared, and an interrupt is initiated so that the keyboard interface 110 is notified. When the microcontroller 52 detects that the battery voltage is not below the low voltage trip level, it checks the backup battery voltage, as represented by decision block 357, to check for failure of the backup battery 56. The microcontroller 52 sets the backup fail flag when the voltage detected is below the backup fail trip voltage and then initiates an interrupt and notifies the keyboard interface 110 that failure of the backup battery 56 has occurred. Once the keyboard interface 110 has been notified, the battery program returns to decision block 350 and the procedure repeats. If the backup battery voltage detected is greater than the backup fail trip voltage, then the program returns to decision block 350 and the procedure repeats.

FIG. 7 is a flow chart which illustrates the procedure followed by the microcontroller 52 when the CPU is powered up and it is determined at decision block 350 that the adapter 58 is connected to the external power source 154. In an activity block 359, the microcontroller 52 sets the adapter in flag, turns on the relay 80, waits 30 milliseconds for the output of the relay 80 to stabilize, and then sets the power good flag. The microcontroller 52 then checks to see if the laptop is on in a decision block 360 by checking the VMAIN voltage input on the signal line 96. If the microcontroller detects that the laptop is on, the battery cannot be charged in full charge mode and an internal laptop on flag is set and the level of the current source 152 is set to TRICKLE CHARGE.

When it is detected at decision block 360 that the laptop is not on, the microcontroller 52 implements fast charge mode and checks the battery voltage level to detect if the battery 160 is fully charged as illustrated in decision block 362. If the battery 160 is not fully charged, the charge control signal is output low and the current source 152 supplies current to the battery 160 at the fast charge rate. Further, the relay 80 is turned off such that the VSOURCE input to the relay 80 is output to the converter 90.

Once the fast charge current level is activated, the microcontroller 52 then begins the temperature and voltage monitoring process described in detail above to monitor the charge status of the battery 160 and determine when full charge has occurred. As illustrated at decision block 364, the microcontroller looks for a voltage peak of 7 volts. If this peak is not detected, the microcontroller 52 then checks to determine if the battery voltage is greater than 5.5 volts, as illustrated at decision block 366. If the battery voltage is less than 5.5 volts, the battery cannot be fully charged and the microcontroller 52 then determines if the stored delta V change in the voltage level of the battery 160 has occurred, represented by decision block 367. If not, the microcontroller 52 checks the level of the voltage from the thermistor to determine if the maximum temperature has been reached, as illustrated at decision block 368. When a temperature lower than the maximum battery temperature is detected, the microcontroller 52 then determines if the set delta T has occurred, as represented by a decision block 370. A decision block 380 illustrates the last charge parameter evaluated by the microcontroller 52 wherein the charge time is read to determine if the time is greater than or equal to the charge time limit. If the charge time limit has not been reached, the microcontroller 52 loops back to the decision block 350 and the process begins again. When any of the above parameters have been met, the full charge flag is set, the relay is turned on to select the VBATTERY input, and the current source 152 in the adapter 58 is set to the trickle charge level.

Thus, by utilizing the procedures illustrated in FIGS. 6 and 7, the microcontroller 52 advantageously monitors and controls the charging operation of the battery without requiring user interaction. Extensive monitoring of battery charge parameters maintains the battery 160 in a fully charged condition, thereby minimizing operating losses due to battery failure and recharging time. In addition, the above described battery management system enables downloading of battery parameters, enabling the system to be used with virtually any laptop computer with minimal modifications.

Although the invention has been described with reference to specific embodiments, the description is intended to be illustrative of the invention and is not intended to be limiting. Various modifications occur to those skilled in the art without departing from the true spirit and scope of the invention as defined appended claims.

What is claimed is

1. A battery controller for controlling and monitoring a rechargeable battery comprising:
   an adapter that includes a voltage source output providing a first source of DC power and a current output, said adapter further including a power available output indicating when said adapter is connected to an external source of power, said adapter further including a control input that receives a control signal, said adapter varying the level of said current output in response to said control signal;
   a rechargeable battery assembly, that includes said rechargeable battery, said assembly further comprising an input connected to said current output of said adapter and an output providing a second source of DC voltage, said assembly having a thermistor thermally coupled to said rechargeable battery, wherein said thermistor is responsive to the temperature of said battery;

a relay that has a first input connected to said first source of DC power and a second input connected to said second source of DC power, said relay further comprising a control input, wherein said control input selects either said first or said second source of DC power as an output;

a backup battery;

a reference voltage source; and a microcontroller which controls and monitors the charging operation of said rechargeable battery, said microcontroller including an input connected to said backup battery to monitor the voltage of said backup battery, an input connected to said thermistor to monitor temperature changes in said rechargeable battery, an input connected to said reference voltage source, an input connected to said power available output of said adapter to monitor the status of said adapter, and an input connected to said rechargeable battery to monitor the voltage level of said rechargeable battery, said microcontroller having a first output connected to said control input of said relay wherein said first output controls the selection of said first or said second source of DC power to said relay output, said microcontroller having a second output connected to said control input of said adapter wherein said second output controls said level of said current output connected to said rechargeable battery, thereby controlling the charging operation of said rechargeable battery.

2. The battery controller defined in claim 1, wherein said controller further includes a memory unit connected to said microcontroller for storing status information relating to said battery.

3. The battery controller defined in claim 1, wherein said microcontroller is further connected to a keyboard interface.

4. The battery controller defined in claim 3 wherein said memory unit further stores temperature and charge parameters relating to said battery, wherein said parameters are downloadable from said keyboard interface.

* * * * *